(12) United States Patent
Sunada et al.

(10) Patent No.: US 9,420,135 B2
(45) Date of Patent: Aug. 16, 2016

(54) SHEET READING APPARATUS

(71) Applicant: CANON KABUSHIKI KAISHA, Tokyo (JP)

(72) Inventors: Hidenori Sunada, Abiko (JP); Satoshi Seki, Abiko (JP); Asahiro Nakayoshi, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/615,917

(22) Filed: Feb. 6, 2015

(65) Prior Publication Data

US 2015/0244888 A1  Aug. 27, 2015

(30) Foreign Application Priority Data

Feb. 27, 2014  (JP) .................. 2014-036335

(51) Int. Cl.
*H04N 1/04* (2006.01)
*H04N 1/00* (2006.01)
*H04N 1/12* (2006.01)

(52) U.S. Cl.
CPC ....... *H04N 1/00588* (2013.01); *H04N 1/00625* (2013.01); *H04N 1/00761* (2013.01); *H04N 1/00771* (2013.01); *H04N 1/00777* (2013.01); *H04N 1/121* (2013.01); *H04N 2201/0081* (2013.01)

(58) Field of Classification Search
CPC .............. H04N 1/00588; H04N 1/121; H04N 1/00625; H04N 1/00771; H04N 1/00777; H04N 1/00761

USPC .................. 358/498, 497, 496, 474
See application file for complete search history.

(56) References Cited

U.S. PATENT DOCUMENTS

| 6,952,541 B2 | 10/2005 | Fujimori et al. | |
|---|---|---|---|
| 7,963,624 B2 | 6/2011 | Yasutani et al. | |
| 8,749,816 B2 | 6/2014 | Sunada et al. | |
| 2013/0235411 A1* | 9/2013 | Oba .................. | G06K 15/4085 358/1.14 |
| 2014/0085691 A1* | 3/2014 | Mori ................. | H04N 1/00013 358/498 |

FOREIGN PATENT DOCUMENTS

| JP | 2011-246224 A | 12/2011 |
|---|---|---|
| JP | 2011-246244 A | 12/2011 |

* cited by examiner

*Primary Examiner* — Houshang Safaipour
(74) *Attorney, Agent, or Firm* — Fitzpatrick, Cella, Harper & Scinto

(57) ABSTRACT

An image reading apparatus conveys a sheet of a sheet bundle on a document tray along a conveyance path one by one, reads images on the sheet and then, delivers the sheet to an output tray. By receiving driving force from a single driving source, each roller included in the image reading apparatus conveys the sheet along with the conveyance path in order. Each roller includes a feed roller, a separation roller, a conveyance roller, and a delivery roller. The reader included in the image reading apparatus obtains images on the sheet passing through the reading position which is set on the conveyance path.

18 Claims, 10 Drawing Sheets

SHEET READING APPARATUS

BACKGROUND OF THE INVENTION

1. Field of the Invention

The present disclosure relates to a sheet reading apparatus for reading an image on a sheet while conveying the sheet.

2. Description of the Related Art

In recent years, an image reading apparatus such as a copying machine, a facsimile machine or the like, which is installed in a small office or a standard home, often includes an auto document feeder (ADF) with an image reading function. The image reading apparatus with an ADF picks up a sheet one by one from a sheet bundle placed on a document tray and conveys the sheet to a reading position. Then, an image on the sheet having conveyed to the reading position is read by a reading unit, which is waiting at the reading position. Upon completion of the reading, the sheet is delivered to a predetermined delivery position.

To achieve further reduction in the cost of the apparatus in the ADF, a feature employing a single driving motor for driving a driving system for conveying a sheet is increasing. The ADF with such a feature is configured, using a mechanical gear constitution, such that the sheet moving speed when the sheet is read is increased compared with that when the sheet is fed. The above configuring allows the ADF to appropriately establish space between a preceding sheet and a following sheet (distance between the sheets) when the sheet is continuously fed from the document bundle. For example, even when a distance between the preceding sheet and the following sheet is zero at the time of sheet feeding, the preceding sheet having passed through a feeding unit is conveyed for reading at a speed faster than a speed when the sheet is fed. Therefore, the distance between the following sheet and the preceding sheet becomes a predetermined distance at a time when the following sheet reaches a reading position.

In addition, there is a phenomenon in which the preceding sheet and the following sheet are overlapped and conveyed when picking up each sheet from the document bundle, which is caused by, for example, a type of the document, the combination of the document, and use environment (temperature, humidity etc.). The phenomenon is called "early jam". When early jam occurs, it becomes difficult to establish distance between the sheets. When the distance between the sheets is too short, reading of the following sheet will not be prepared after the completion of the reading of the preceding sheet. Therefore, sheet conveyance is stopped. As a result, a user is required to perform a predetermined operation for releasing jam.

Japanese Patent Application Laid-open No. 2011-246244 discloses a document conveying device which comprises means to drive conveyance by a single drive motor and means to invert read document. Then, when the distance between the sheets is narrow, the document conveying device inverts the following sheet by an inverting means and reads the sheet. Thereby the distance between the sheets is established to prevent jam.

Even in a case where the distance between the sheets becomes short, the document conveying device does not stop conveying the sheet but continue the operation. However, this may cause early jam because picking up a sheet from a document bundle placed on the document tray is not possible. Assuming such case, there is a high probability that the feature of "not stop conveying", disclosed in the Japanese Patent Application Laid-open No. 2011-246244, may have an adverse effect, or, it may increase the burden on a user.

In particular, description is given in a case where each sheet of the document bundle is not appropriately separated and the sheet is conveyed with partially or fully overlapped. In this case, the document conveying device disclosed in the Japanese Patent Application Laid-open No. 2011-246244 continue the reading operation to the end of the sheet, which may lead the user to determine that the reading is successfully completed. Therefore, the user fails to notice, on the spot, that there was a failure in normally reading each sheet of the document bundle. This leaves a problem that it becomes difficult to sort the sheet which is already read and the sheet which is yet to be read.

The object of the present disclosure is, in light of the above-mentioned problem, to provide an image reading apparatus which can easily sort sheets which are already read and sheets which are yet to be read when early jam occurs and sheet conveyance is stopped.

SUMMARY OF THE INVENTION

According to an aspect of the present disclosure, a sheet reading apparatus includes: a feed unit configured to feed sheet to a conveyance path one by one, the sheet placed on a document tray; a conveyance unit configured to convey the sheet to a reading position along with the conveyance path; a delivery unit configured to convey a sheet having passed through the reading position on a delivery tray; a motor for driving the conveyance unit and the delivery unit; a detection unit configured to detect a sheet being conveyed along with the conveyance path; a reading unit configured to read the sheet being conveyed by the conveyance unit which passes through the reading position; and a control unit configured to control the motor based on a detection result of the detection unit. The control unit is further configured to stop the motor in a case where a rear end of the sheet being conveyed is not detected within a predetermined time after a timing at which a front end of the sheet being conveyed is detected, and the control unit is further configured to control to stop the motor such that, in a case where a distance between a preceding sheet which is being conveyed by the delivery unit and a following sheet which is being conveyed by the conveyance unit is shorter than a predetermined distance, the preceding sheet is delivered to the delivery tray and the following sheet remains on the conveyance path.

Further features of the present invention will become apparent from the following description of exemplary embodiments (with reference to the attached drawings).

DESCRIPTION OF THE EMBODIMENTS

Now, embodiments of the present disclosure, in which the present invention is applied to an image reading apparatus, are described below in detail with reference to the drawings.

First Embodiment

Figure 1:
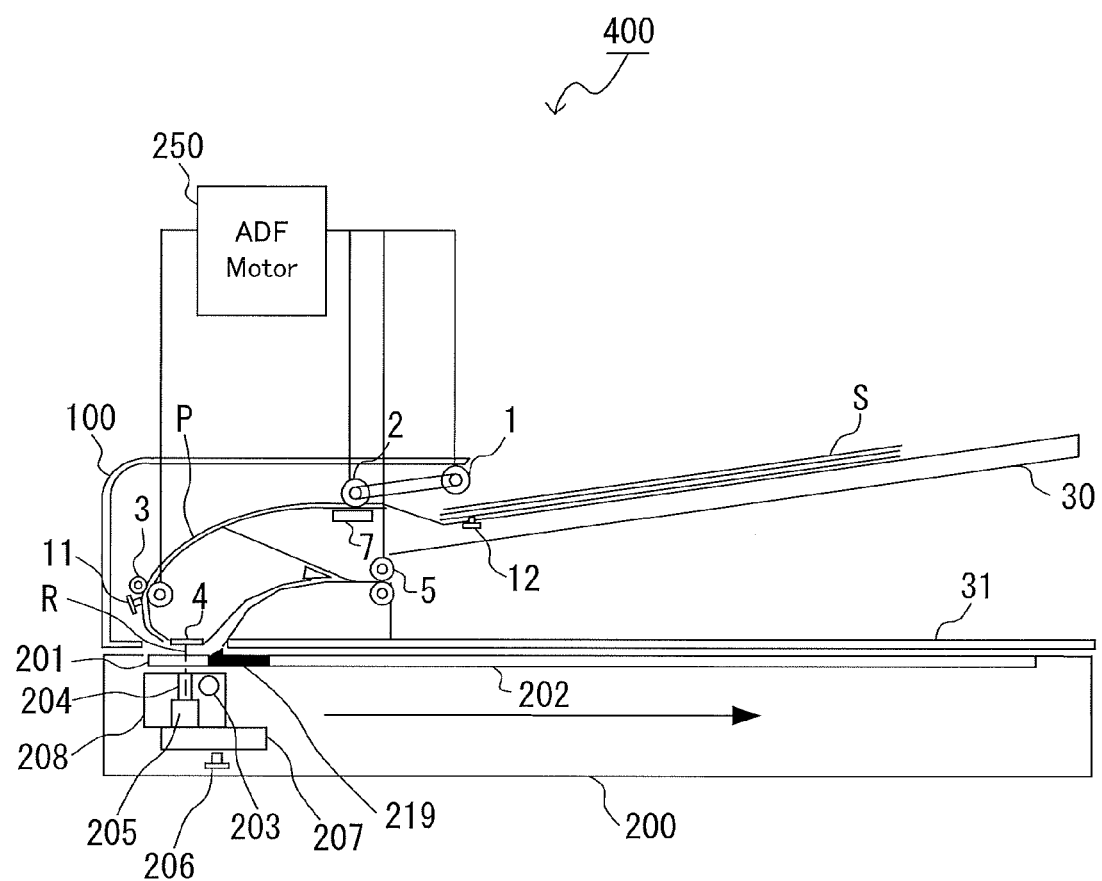
FIG. 1 is a schematic longitudinal sectional view of an image reading apparatus according to a first embodiment.

FIG. 1 is a schematic longitudinal sectional view of an image reading apparatus according to the present embodiment. The image reading apparatus 400 shown in FIG. 1 has an auto document feeder (hereinafter referred to as ADF) 100, a reader 200 and a control unit (not shown). Description will be given with regard to some main features of the ADF 100 and the reader 200.

The ADF 100 conveys each document (sheet) from a document bundle S (sheet bundle) placed on a document tray 30, which is a feed unit, in order along with a conveyance path. The ADF also delivers a sheet with images, which is read by the reader 200, to a delivery tray 31. In particular, near an entrance of the conveyance path shown in FIG. 1, a feed roller 1, a separation roller 2, a separation pad 7 and the like are provided, which are to pick up one sheet from the document bundle S placed on the document tray 30 to feed to the conveyance path P. Further, a conveyance roller 3 is provided on the conveyance path P. The conveyance roller 3 nips the separated/fed sheet and conveys the sheet to a downstream side. Further, a sheet end sensor 11 is provided on a downstream side of the conveyance roller 3. The sheet end sensor 11 detects the sheet end in a sheet conveyance direction. A guide plate 4 is provided on a further downstream side of the sheet end part sensor 11. A delivery roller 5 is provided on a further downstream side of the guide plate 4. The guide plate 4 nips the conveyed sheet to deliver to the delivery tray 31. Note that a document presence/absence sensor 12 is provided on the document tray 30. The document presence/absence sensor detects presence and absence of the sheet. Also, driving force from driving mechanism (described later) is transmitted to each roller.

The reader 200 reads images on the sheet conveyed by the ADF 100. In particular, the reader 200 comprises a scanner unit 208 for reading images on the sheet passing through a reading position R set on the conveyance path (on the conveyance path P). The scanner 208 is a unit in which an LED 203, a lens 204 and an image sensor 205 are arranged. The LED 203 irradiates light to the sheet. A reflection light from the sheet passes through the lens 204. The image sensor 205 receives the reflection light which passed through the lens. Also, a home position detection flag 207 is provided on a bottom of the scanner unit 208. The home position detection flag 207 is used to detect a position of the scanner unit 208 which uses a home position sensor 206 provided on a bottom plate of the reader 200. Further, the reader 200 comprises a flow-reading glass 201 and a reference white board 219. The flow-reading glass 201 is provided at a position opposed to the guide plate 4 by sandwiching the conveyance path P. The reference white board 219 performs shading of the scanner unit 208. Each operation of the ADF 100 and the reader 200 will be described using FIGS. 1 and 2.

Figure 2A:
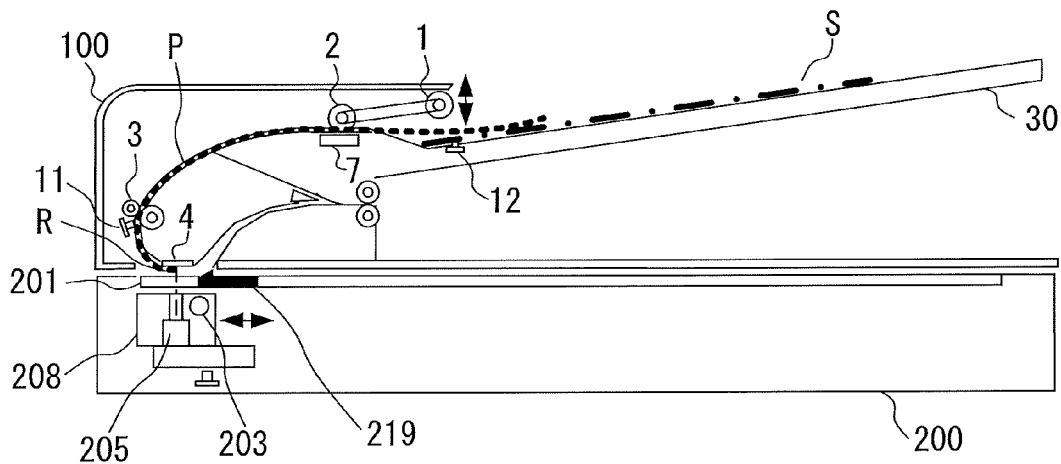
FIGS. 2A, 2B and 2C are diagrams explaining the image reading operation in the image reading apparatus.
Figure 2B:
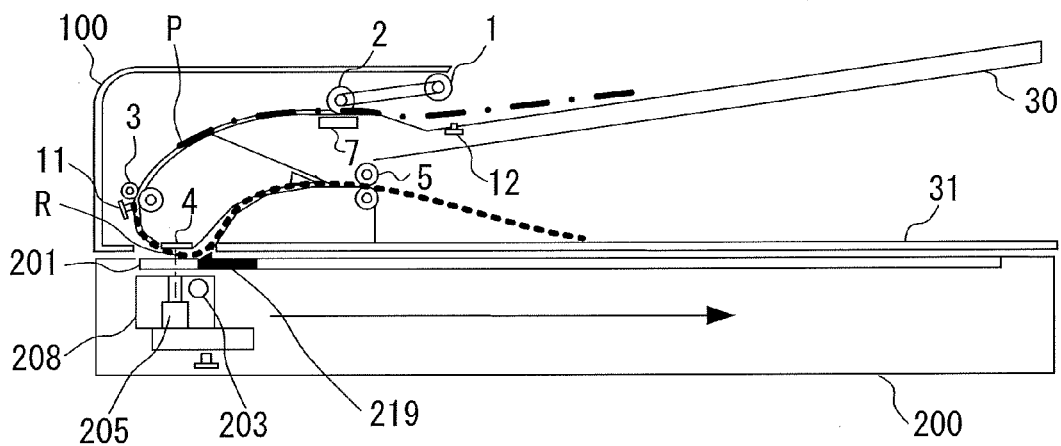
Figure 2C:
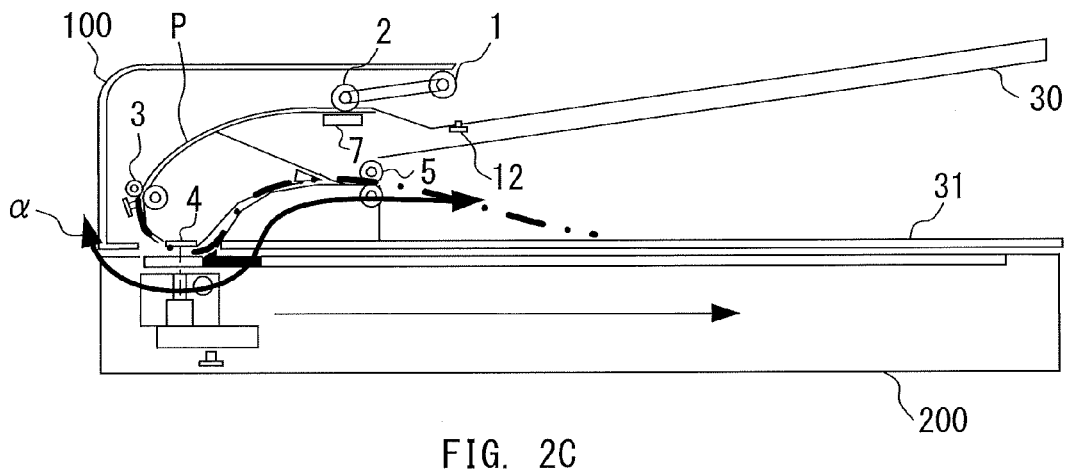

FIGS. 2A, 2B, and 2C are diagrams explaining the image reading operation in the image reading apparatus 400. Note that the sheet which is precedingly fed/conveyed is shown by a dotted line, and the sheet which is followingly fed/conveyed is shown by a chain line. As shown in FIG. 2A, in response to receiving an image reading job, the scanner unit 208 moves to a position immediately below the reference white board 219. Then, based on an output value from the image sensor 205, in which LED 203 is turned OFF (black) and an output value from the image sensor 205, in which the LED 203 is turned ON (white), shading correction data is generated. The shading correction data is used for shading correction, which is performed to the image data output from the image sensor 205. Thereafter, the scanner unit 208 moves to a position immediately below the flow-reading glass 201 and waits until the sheet reaches the reading position R.

As shown in FIG. 2A, in response to receiving the image reading job, the ADF 100 starts to move in a downward direction and rotate such that the feed roller 1 comes into contact with a top sheet surface of the document bundle S. When the feed roller 1 contacts with the sheet surface, sheet feeding is started. Note that overlap feeding of the sheet is controlled by the separation roller 2 and the separation pad 7, thereby the sheet of the document bundle S is fed one by one from the document tray 30. That is, for example, even in a case where two sheets are overlappingly fed by the feed roller 1, due to the action of the separation roller 2 and the separation pad 7, the two sheets are separated and only the upper sheet is conveyed. The separation action is realized by a widely known separation technology.

Further, in the image reading apparatus of the present embodiment, an ADF motor 250 is a driving source of the driving mechanism for driving the feed roller 1 and the separation roller 2. The ADF motor 250 is also the driving force for the conveyance roller 3 and the delivery roller 5. That is, all rollers included in the ADF 100 for feeding/conveying the sheet are driven by a single ADF motor 250. Note that in the image reading apparatus 400, counting of driving clock of the ADF motor 250 is started at a timing at which the sheet feeding is started by the feed roller 1.

As shown in FIG. 2A, the sheet is conveyed by a rotational force of the separation roller 2 until it reaches the conveyance roller 3, that is, until the sheet is nipped by the conveyance roller 3. A circumferential speed of the conveyance roller 3 and the delivery roller 5 is faster than that of the feed roller 1 and the separation roller 2. Thus, when the sheet reaches the conveyance roller 3, the sheet is nipped by the conveyance roller 3 and the rotational force of the conveyance roller 3 is applied, thus the sheet moving speed is accelerated. Note that even in a case where the driving clock number of the ADF motor 250, counted after the feed roller 1 is started to move, exceeds a predetermined value (a first count value), the sheet end sensor 11 may not detect the front end of the sheet. In this case, it is highly possible that the separation roller 2 failed to feed the sheet. The image reading apparatus 400 determines that paper jam (delay jam) occurred.

Thereafter, the sheet conveyed by the conveyance roller 3 passes through between the guide plate 4 and the flow-reading glass 201. Then, it reaches the reading position R. A timing at which the front end of the sheet reaches the reading position R is determined using timing at which the front end of the sheet was detected by the sheet end sensor 11. The timing at which the front end of the sheet is detected means a timing at which the counted number of the driving clock of the ADF motor, started to count after the sheet end sensor 11 detected "ON", reaches a predetermined number. A sheet moving distance per one clock of the driving clock corresponds to the rotation amount of the conveyance roller 3 per one clock of the driving clock. Therefore, based on the counted driving clock number, the sheet moving amount can be assumed. That is, a timing at which the front end of the sheet reached the reading position R of the flow-reading glass 201 (timing of FIG. 2) can be determined. Also, in response to the arrival of the front end of the sheet at the reading position R, image reading with the scanner unit 208 is started. The sheet having passed through the reading position R of the flow-reading glass 201 passes through a jump stand formed above the reference white board 219. Then, the sheet is conveyed to the delivery roller 5 provided on a downstream side of the guide plate 4.

Further, starting from a timing at which image reading is started, the driving clock number of the ADF motor is counted until the rear end of the sheet is detected by the sheet end sensor (OFF: sheet absence). There is an upper limit to a sheet length which is feedable as a product (a sheet length in a conveyance direction). Therefore, after the start of the image reading, when the driving clock number exceeds a predetermined driving clock number, which is determined based on the upper limit size of the specification, and the sheet end sensor did not turn "OFF", the image reading apparatus 400 determines that stay jam occurred.

Note that, a timing at which the rear end of the sheet reached the reading position R is determined as in a determination of a timing at which the front end of the sheet reached the reading position R. That is, the timing is determined using the timing at which the rear end of the sheet was detected by the sheet end sensor 11 and the counted value of the driving clock. Then, when the rear end of the sheet reaches the reading position R, the scanner unit 208 completes the image reading. Then, the sheet having been read the image is delivered to the delivery tray 31 by the delivery roller 5.

Also, immediately after the rear end of the preceding sheet passes through the feed roller 1, the feed roller 1 starts to feed to the following sheet.

At a timing shown in FIG. 2B, the preceding sheet is conveyed by the conveyance roller 2 and the delivery roller 5. On the other hand, the following sheet is conveyed by the feed roller 1 and the separation roller 2. A circumferential speed of the conveyance roller 3 and the delivery roller 5 is faster than that of the feed roller 1 and the separation roller 2. Therefore, when the sheet reaches the conveyance roller 3 and the sheet is nipped by the conveyance roller 3, the sheet moving speed is accelerated. Thus, when the following sheet reaches the conveyance roller, the space between the preceding sheet and the following sheet (distance between the sheets) is sufficiently established.

Note that, there is a possibility that, in a case where the front end of the following sheet is detected immediately after the detection of the rear end of the preceding sheet by the sheet end sensor 11, error detection occurs due to a vibration of mechanical flag connected to the sheet end sensor 11. Therefore, the image reading apparatus 400 does not perform detection of any ON/OFF level change of the sheet end sensor 11 during a predetermined time after the rear end of the preceding sheet is detected. Thereby the occurrence of the error detection is prevented.

The document presence/absence sensor 12 detects the presence/absence of the following sheet on the document tray at a timing at which the rear end of the preceding sheet was detected at the sheet end sensor 11. As shown in FIG. 2C, if it is detected by the document presence/absence sensor 12 that there is no sheet left on the document tray 30, the image reading apparatus 400 continues to rotate the ADF motor 250. The rotation is continued after the rear end of the final sheet separates from the conveyance roller 3, passes through the reading position R, separates from the nip part of the delivery roller 5 and is delivered to the delivery tray 31. Further, the image reading apparatus 400 continues to additionally rotate the delivery roller 5 such that the rear end of the sheet is not caught by the delivery roller 5. Thereafter, the image reading apparatus 400 stops rotating the ADF motor 250. After rotating the ADF motor 250 by the driving clock number required for the rear end of the sheet to move a section shown by an arrow a after the detection of the rear end of the sheet by the sheet end sensor 11, the image reading apparatus 400 stops rotating the ADF motor 250. Then, the image reading apparatus 400 reversely rotates the ADF motor 250 by a predetermined driving clock number to upwardly move the feed roller 1. The image reading of each sheet of the document bundle S placed on the document tray 30 is performed in this way. Through the reverse rotation of the ADF motor 250, the feed roller 1 upwardly moves. Then, through the normal rotation of the ADF motor 250, the feed roller 1 rotates. Gravity causes downward movement of the feed roller 1. Description will be given in a case where such image reading apparatus 400 is applied to an image reading system having, for example, a printing function.

<Configuration of Image Reading System>

Figure 3:
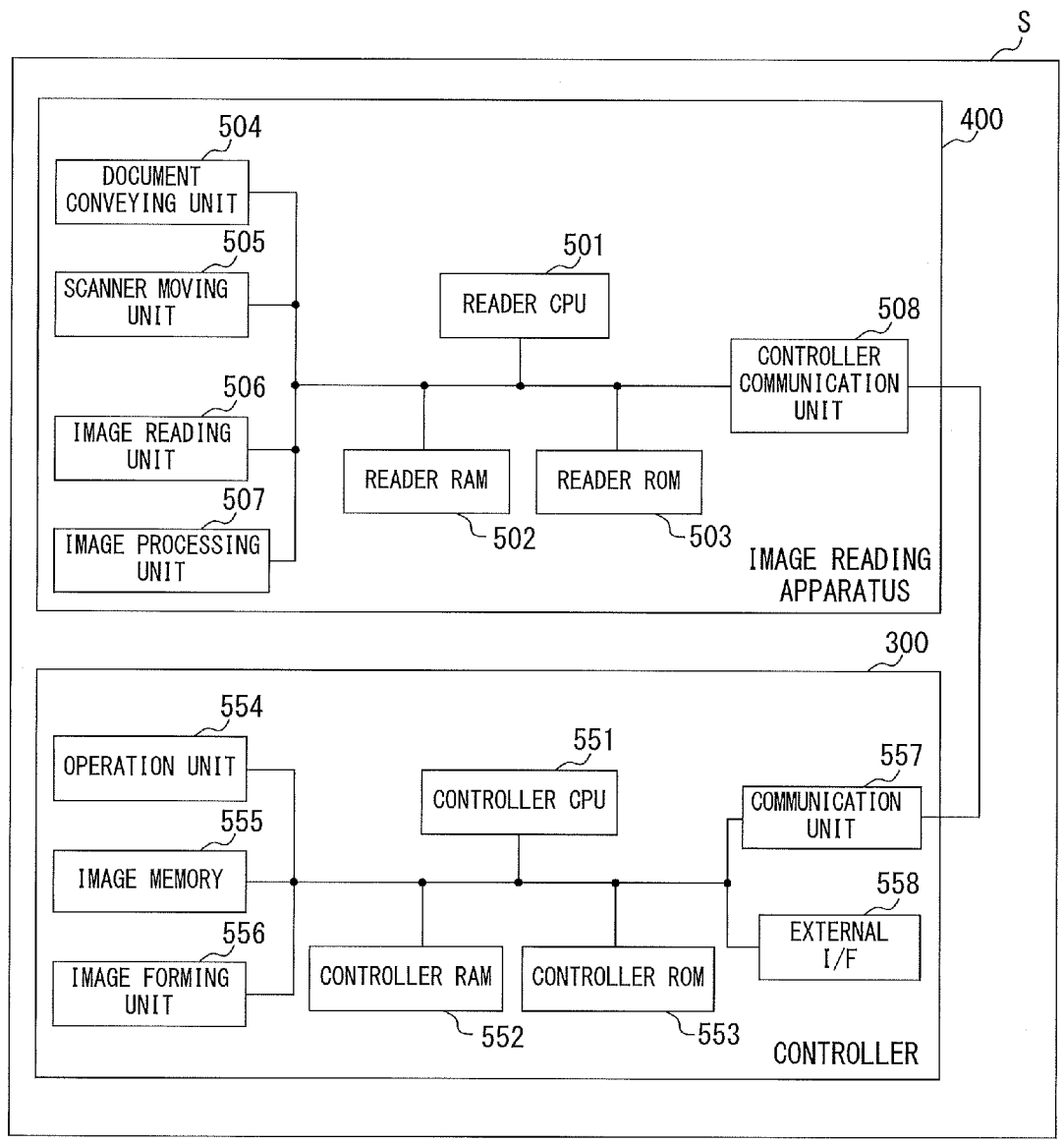
FIG. 3 is a block diagram illustrating an example of functional configuration of the image reading apparatus system.

FIG. 3 is a block diagram illustrating an example of functional configuration of the image reading apparatus system. The image reading apparatus system S comprises an image reading apparatus 400 and a controller 300. The controller 300 works as a control unit for controlling an entire image reading apparatus system S. The image reading apparatus 400 comprises a reader central processing unit (CPU) 501, a reader random access memory (RAM) 502, a reader read only memory (ROM) 503, document conveying unit 504, and a scanner moving unit 505. The image reading apparatus 400 further comprises an image reading unit 506, an image processing unit 507 and a controller communication unit 508. The controller 300 comprises a controller CPU 551, a controller RAM 552, a controller ROM 553, an operation unit 554, an image memory 555, an image forming unit 556, a communication unit 557 and an external interface (I/F).

The reader CPU 501 in the image reading apparatus 400 controls the ADF 100 and the reader 200. The reader ROM 503 stores various programs in which control contents to be performed by the reader CPU 501 is recorded. The reader RAM 502 is used as a work area where the reader CPU 501 requires executing the program. Note that, not only used as the work area of the reader CPU 501, but the reader RAM 502 is used as a storage area, in which an image data to which processing such as shading and the like is performed by the image processing unit 507 (described later) is temporarily stored. The reader RAM 502 stores image data of the image read in the image reading unit 506 (described later).

As mentioned, the ADF motor 250 is a driving source of all rollers for feeding/conveying sheets included in the ADF 100. The document conveying unit 504 performs control of the ADF motor 250, including its rotation and stop and its rotation direction (normal rotation and reverse rotation). The document conveying unit 504 also performs control of the sheet end sensor 11 and the document presence/absence sensor 12. Based on the detection result of the home position sensor 206, the scanner moving unit 505 controls movement of the scanner unit 208 to a position immediately below the flow-reading glass 201, the reference white board 219 and a document-fix reading glass 202 in response to the content of a job. The image reading unit 506 controls the LED 203, the lens 204 and the image sensor 205 included in the scanner unit 208 such that the image reading is performed in a desired operation mode. The image processing unit 507 erases an unnecessary image area read in the image reading unit 506. Also, the image processing unit 507 rearranges image data and the like. The processed image data is transferred to the controller 300 via the controller communication unit 508 (described later). The controller communication unit 508 receives a job transmitted from the controller 300. Then, the controller communication unit 508 transmits the image data processed in response to the content of the received job to the controller 300.

The controller CPU 551 of the controller 300 performs various controls of the entire image reading apparatus system S. For example, based on a print instruction received by the image forming unit 556 (described later), the controller CPU 551 controls print operation such as executing copy.

The controller ROM 553 stores various programs in which control contents to be performed by the controller CPU 551 is recorded. The controller RAM 552 is used as a work area where the controller CPU 551 is required to execute the program. The controller RAM 552 is used as a temporal storage area until the image data is stored in the image memory 555. Further, the controller RAM 552 is also used as a temporal storage area when the image data is read from the image memory 555 and the data is transferred to an external network line via an external IF 558 (described later).

The operation unit 554 comprises a user interface (UI) for receiving various operations from the user, which, for example, displays the content of job currently being executed, displays various settings to the system or displays input screen for receiving instruction when jam occurs. The image memory 555 stores image data received via the external I/F 558 and the communication unit 557. The image memory 555 is a large capacity recording medium such as hard disk drive (hereinafter referred to as HDD). The image forming unit 556 is a printer which prints images on a recording paper based on the image data obtained through reading. Description will be given with regard to a configuration of driving mechanism of the ADF 100 which is controlled by the document conveying unit 504 of the image reading apparatus 400.

<Configuration of Driving Mechanism>

The driving mechanism distributes driving force generated by the ADF motor 250 to the feed roller 1, the separation roller 2, the conveyance roller 3 and the delivery roller 5 via a plurality of gears. Further, rotational speed of the roller to which the driving force of the ADF motor 250 is distributed is determined based on the difference in the number of teeth of each gear. That is, speed ratio between the rollers is determined by the plurality of gears. The driving force of the ADF motor 250 is distributed to each roller only through each gear. Therefore, the image reading apparatus 400 does not have clutch mechanism, which turns ON/OFF of the distribution/transmission of the driving force and prevents the roller from rotating even when the ADF motor 250 is rotating.

Further, the conveyance roller 3 rotates only in a fixed direction. In particular, there is a pair of gears in a gear train, which transmits the driving force from the ADF motor 250 to the conveyance roller. According to the rotation direction of the ADF motor 250, the selected one of the pair of gears is connected to the gear train to rotate the conveyance roller 3 in a predetermined direction.

<Early Jam Phenomenon>

Figure 4:
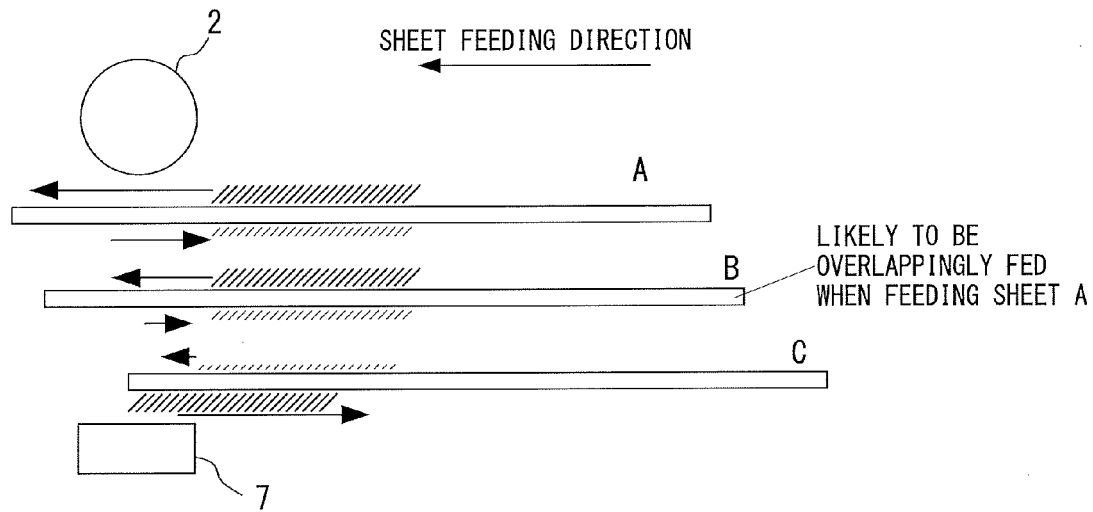
FIG. 4 is a diagram explaining early jam phenomenon which likely occurs in an ADF of general image reading apparatus.

FIG. 4 is a diagram explaining early jam phenomenon which likely occurs in the ADF of general image reading apparatus. Various types of sheets are read by the ADF. Therefore, compared with the image forming apparatus which conveys sheets of the same kind, in the image reading apparatus which conveys various types of sheets, a phenomenon of partially feeding the following sheet when feeding the preceding sheet likely occurs. The phenomenon, generates a state in which established distance between the preceding sheet and the following sheet cannot be established. In the present embodiment, the state is called "early jam". Description will be given with particular examples.

FIG. 4 schematically shows a state in which three sheets (sheets A, B and C) are being sandwiched between the separation roller 2 and the separation pad 7 (separation nip part). For example, the sheet A and the sheets B are the sheets of the same kind. Both sheets have a rough surface with a high friction degree. Further, an image is formed on a back surface of each sheet by printing. The sheets A and B are overlapped. In this state, the end part of each of the sheets A and B is cut together. The sheet C, for example, is a sheet different from the sheets A and B in its material. The sheet C has a smooth front surface with low friction degree. Further, an image with high density is formed on both front surface and back surface of the sheet C.

The ADF performs paper feeding from a topmost sheet (sheet A) of the document bundle, formed by stacking the sheets A, B, and C, in order. Following shows the relation of friction between each sheet when each sheet is fed. Sheet A: A front surface of the sheet A abuts on the separation roller 2 which rotates. Therefore, a force for moving in the sheet feeding direction strongly acts. On the contrary, a degree of friction between the back surface of the sheet A and a front surface of the sheet B is high. Further, by cutting, sheets burr occurs. As a result, the sheet A is in close contact with the sheet B. Sheet B: The front surface of the sheet B is in contact with the back side of the sheet A. A degree of friction between the front surface of the sheet B and the back surface of the sheet A is high. That is, the sheet B is likely to be fed in accordance with the sheet A in the sheet feeding direction. Images are formed on the back surface of the sheet B. Also, the sheet C has smooth front surface. Therefore, a degree of friction between the front surface of the sheet C and the back surface of the sheet B is low. Sheet C: A degree of friction between the front surface of the sheet C and the back surface of the sheet B is low. On the contrary, a frictional force of the separation pad 7 which is in contact with the back surface is strong so that the back surface of the sheet C is in contact with the separation pad 7. Note that diagonal line and arrow in FIG. 4 show strength of frictional force of front surface and back surface of each sheet on the above-mentioned state. Also, in FIG. 4, the longer diagonal line shows the stronger frictional force.

In a state shown in FIG. 4, the sheet B is likely to be fed along with the sheet A. This is because friction between the front surface of the sheet B and the back surface of the sheet A is strong so that a force of the separation roller 2 for feeding the sheet A also acts on the sheet B. As a result, a force for moving in the sheet feeding direction becomes strong. On the other hand, there is little friction between the back surface of the sheet B and the front surface of the sheet c. When the back surface of the sheet B is in contact with the separation pad 7, strong frictional force between the back surface of the sheet B and the separation pad (7) occurs. However, an area of the back surface of the sheet C which is in contact with the separation pad 7 is large whereas an area of the back surface of the sheet B which is in contact with the separation pad 7 is small. Therefore, the sheet B is moved together with the sheet A and passes through the separation nip part between the separation roller 2 and the separation pad 7. Note that when the sheet is fed in a low humidity environment, due to occurrence of static electricity, the one sheet tends to strongly stick to the other sheet is enhanced. This also contributes occurrence of such phenomenon. Description will be given with respect to a distance between the sheets between a rear end of a preceding sheet and a front end of a following sheet when the sheets are continuously read.

<Distance Between the Sheets when Continuous Reading is Performed>

Figure 5:
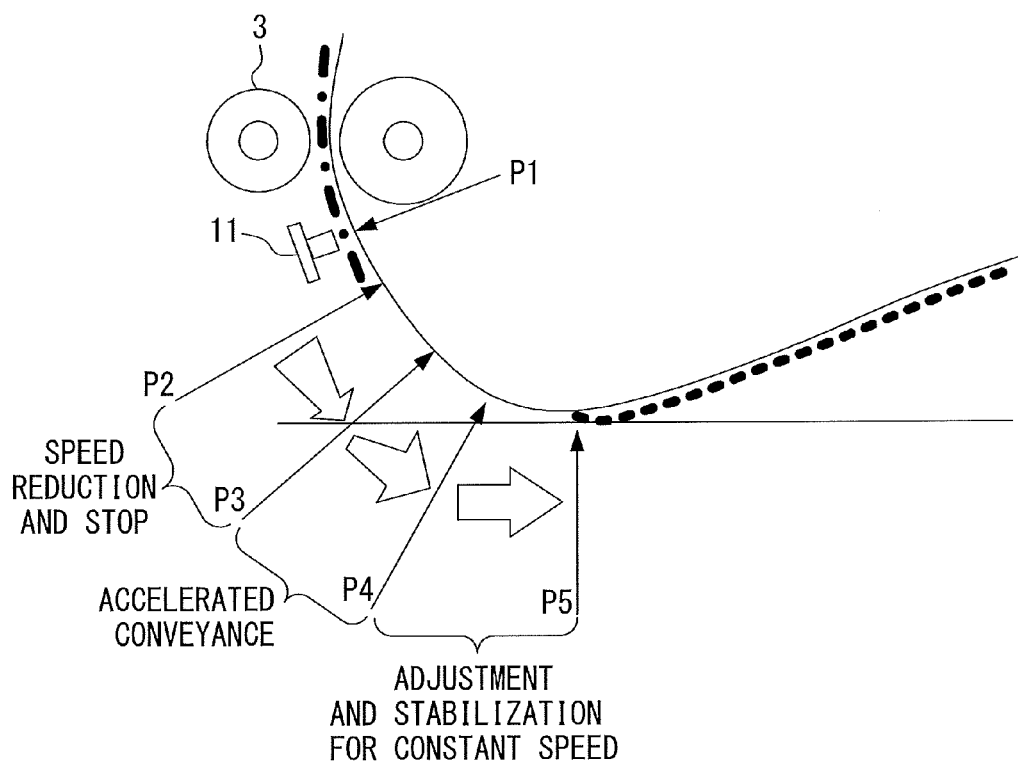
FIG. 5 is a diagram explaining distance between the preceding sheet and the following sheet.

FIG. 5 is a diagram explaining distance between the sheets between the preceding sheet and the following sheet. Note that the sheet which is precedingly fed/conveyed is shown by dotted line, and the sheet which is followingly fed/conveyed is shown by chain line. An arrow P5 in FIG. 5 shows a position of reading position R (see FIG. 1). Further, an arrow P1 shows detecting the position of the sheet end sensor 11.

FIG. 5 shows a state which is immediately after the completion of the reading of the preceding sheet, at which timing, reading of the following sheet is started to prepare. Further, the front end of the following sheet passes through the detecting position of the sheet end sensor 11. Then, the front end of the following sheet is positioned at P2. A distance between the sheets which is at least required as a space between the preceding sheet and the following sheet is shown in FIG. 5. In particular, the distance between the position shown by the arrow P2 and the position shown by the arrow P5 shown is the distance between the sheets which is at least required. In other words, if the distance between the sheets cannot be established, the image reading apparatus 400 determines that early jam occurred and stops reading the following sheet. Following shows the reason why the image reading apparatus 400 controls as above.

The image reading apparatus 400 starts to prepare reading of the following sheet at a timing at which the rear end of the preceding sheet reached the position shown by the arrow P5. Then, if the reading of the following sheet is not yet prepared at a time when the front end of the following sheet reached the position shown by the arrow P2, the image reading apparatus 400 stops conveying the sheet. That is, sheet conveyance of both the preceding sheet and the following sheet is stopped. A section defined by the arrow P2 and an arrow P3 is a "speed reduction and stop" section. In the section, a distance required to reduce sheet conveyance speed of the following sheet being conveyed to stop the sheet conveyance is represented. The distance of the "speed reduction and stop" section is referred to as a first distance. Then, a state in which sheet conveyance is stopped is kept for a period during which reading of the following sheet is prepared. Then, the sheet conveyance is resumed at a time when reading of the following sheet is prepared. A section defined by the arrow P3 and an arrow P4 is an "accelerated conveyance" section. In the section, a distance required, when the sheet conveyance is resumed, to accelerate a reading speed to a predetermined reading speed from the state of sheet conveyance stop is represented. The distance of the "acceleration rising" section is referred to as a second distance. Also, a section defined by the arrow P4 and the arrow P5 is "adjustment and stabilization for constant speed" section. In the section, a distance required for stabilization of the sheet conveyance state after accelerating the reading speed is represented. The distance of the "adjustment and stabilization for constant speed" section is referred to as a third distance.

Therefore, the distance shown by the arrows P2 to P5, that is, the total distance of the first distance, the second distance and the third distance represents the distance between the sheets which is at least required between the preceding sheet and the following sheet. If the distance between the sheets cannot be established, the image reading apparatus 400 according to the present embodiment determines that early jam occurred. That is, if the front end of the following sheet passed through the position shown by the arrow P2 at a timing at which the rear end of the preceding sheet reaches the position shown by the arrow P5, the image reading apparatus 400 determines that early jam occurred.

<Reading Operation of Image Reading Apparatus>

Figure 6:
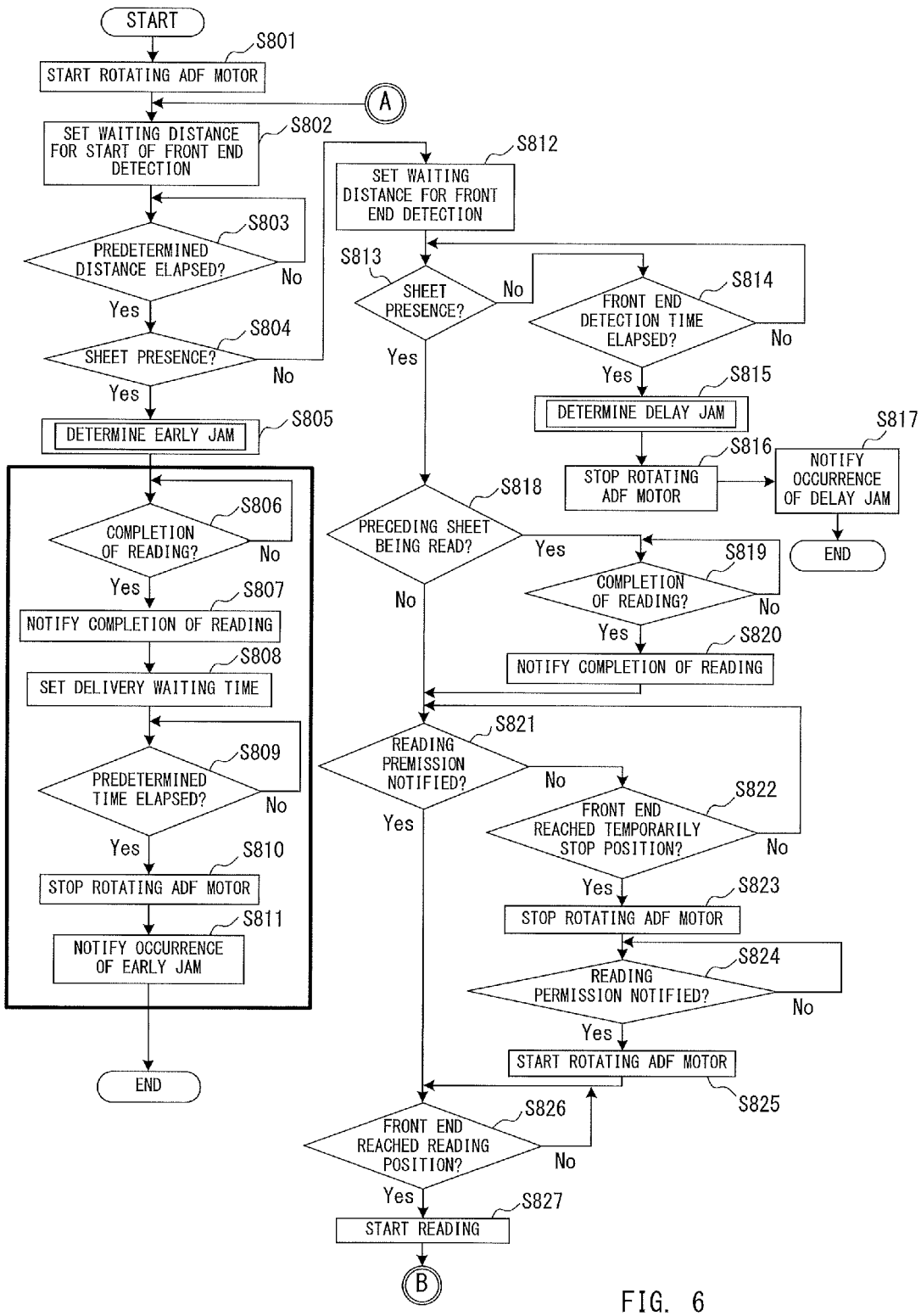
FIG. 6 is a flowchart illustrating an example of a processing procedure of image reading apparatus.
Figure 7:
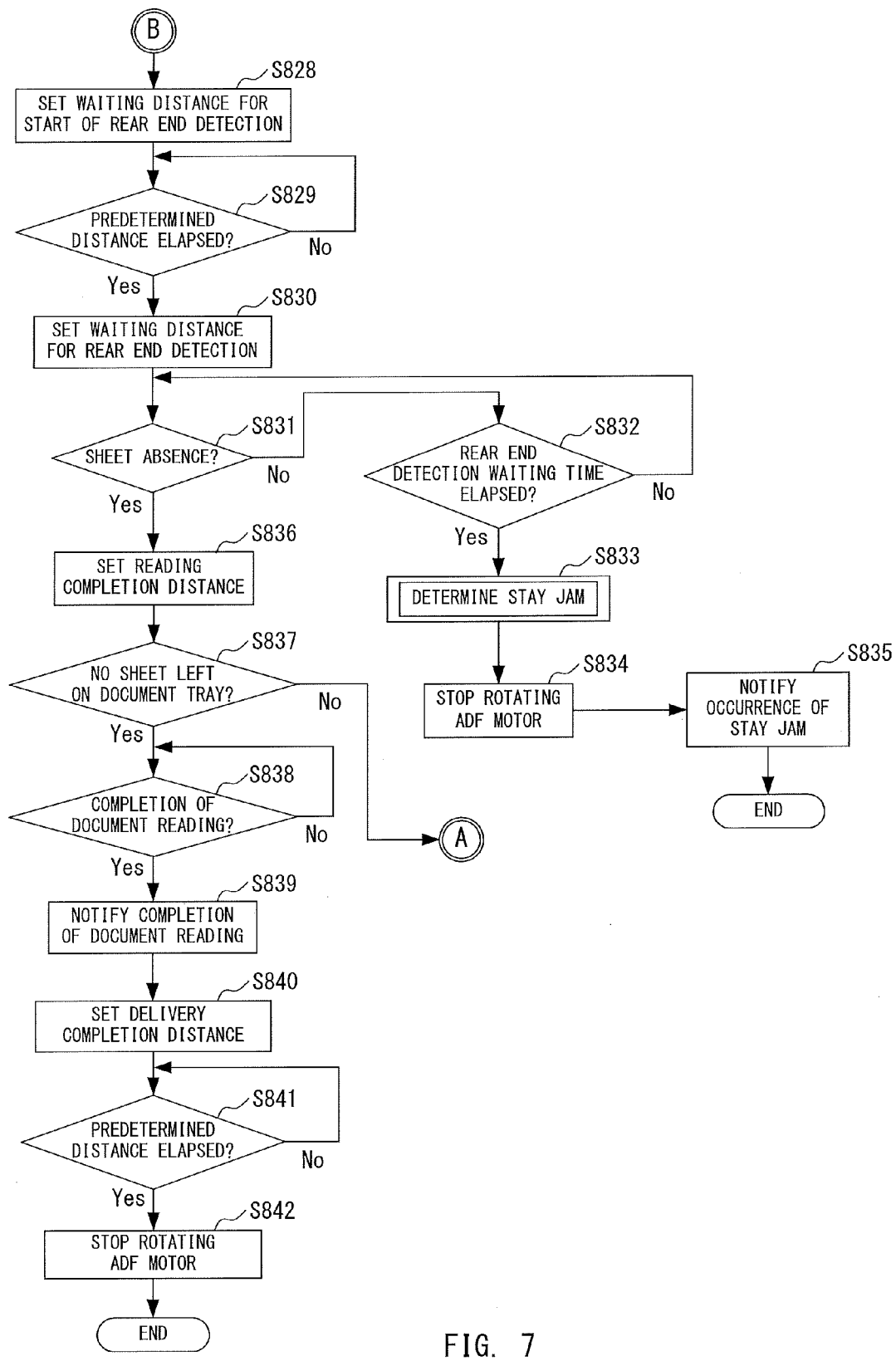
FIG. 7 is a flowchart illustrating an example of a processing procedure of the image reading apparatus following FIG. 6.
Figure 8:
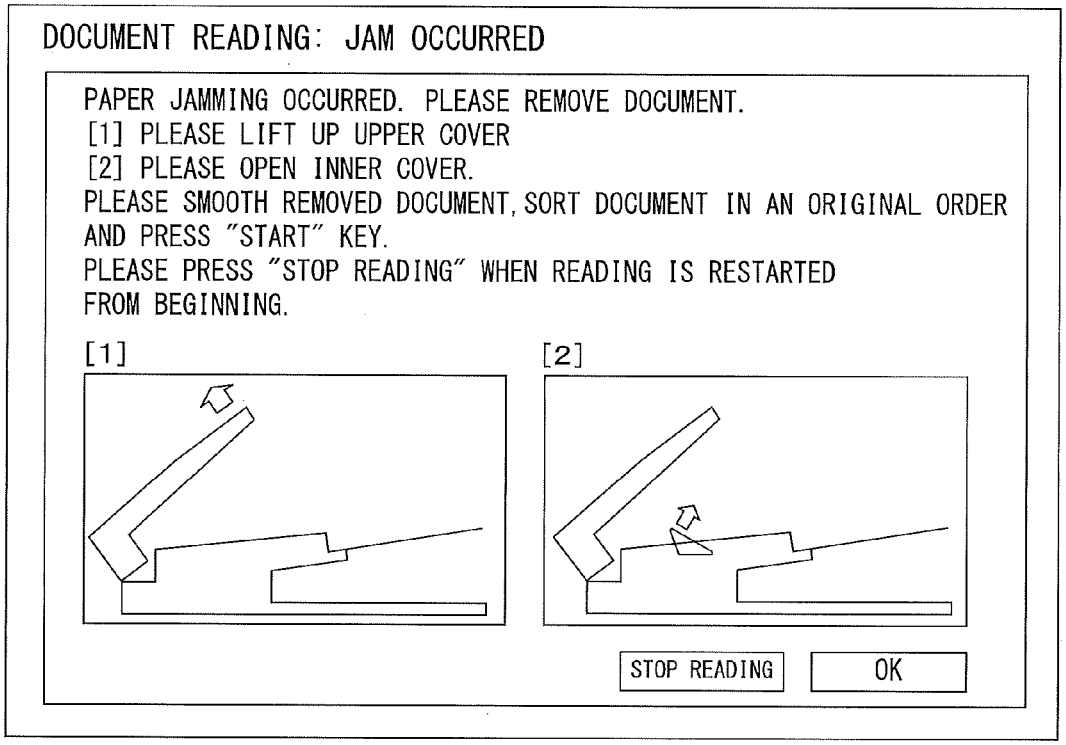
FIG. 8 is a diagram illustrating an example of a UI screen displayed on a display screen of operation unit when jam occurs.

FIGS. 6 and 7 are flowcharts illustrating examples of a processing procedure of the image reading apparatus 400. FIG. 8 is a diagram illustrating an example of a UI screen displayed on a display screen of the operation unit 554 when jam occurs. Description is given, using FIGS. 6, 7, and 8, with regard to a processing procedure in the image reading apparatus 400, in which jam control occurred when reading image and reading operation are mainly described. Note that description will mainly be given with regard to processing performed by the reader CPU 501 when instruction to start document reading is given by a user via the operation unit in a state where document presence is detected by the document presence/absence sensor 12.

The reader CPU 501 starts to prepare reading by the scanner unit 208. Also, the reader CPU 501 starts to rotate the ADF motor 250 (S801). Sheet feeding is started in this way. The reader CPU 501 sets waiting time (waiting distance), which is a time to wait for a start of detecting the front end of the sheet by the sheet end sensor 11 (S802). Note that even in a state where the ADF 100 is not feeding the sheet, the sheet end sensor 11 detects presence/absence of the sheet. On the other hand, in a state where the ADF 100 is not feeding the sheet, no special processing is needed. In a state where the ADF 100 is feeding the sheet, when the detection result of the sheet end sensor 11 turns from "sheet absence" state to "sheet presence" state, the reader CPU 501 determines that the front end of the sheet is detected. Also, in a state where the ADF 100 is feeding the sheet, when the detection result of the sheet end sensor 11 turns from "sheet presence" state to "sheet absence" state, the reader CPU 501 determines that the rear end of the sheet is detected.

Note that, when the reading is first started, the front end of the first sheet may reach the sheet end sensor 11 any time, so that detection of the front end of the sheet is immediately started. Therefore, the distance to wait (waiting distance) is set to 0 [mm]. That is, the waiting time to wait until the detection of the front end of the sheet is started is set to 0 minute.

The reader CPU 501 determines whether the set waiting time (waiting distance) elapsed (S803) or not. The lapse of the waiting distance can be determined by counting the driving clock number which rotates the ADF motor 250. Since the set waiting time is 0 [mm], in practice, the detection of the front end of the sheet is immediately started by the sheet end sensor 11.

The reader CPU 501 determines whether sheet presence is already detected by the sheet end sensor 11 at a time when the detection of the front end of the sheet is started (S804) or not. If it is determined that sheet presence is detected (S804: Yes), the reader CPU 501 determines that early jam occurred and moves to processing of Step S805. If it is determined sheet presence is not detected (S804: No), the reader CPU 501 moves to processing of Step S812. Note that at a time when the first sheet is being fed, no sheet precedes the first sheet. Therefore, early jam does not occur.

The reader CPU 501 sets waiting time (waiting distance), which is a time to wait for the detection of the front end of the sheet (S812). Note that, in the present embodiment, the sheet moving distance by the separation roller 2 per one clock in the driving clock of the ADF motor 250 is 0.059 [mm]. Also, in the present embodiment, the waiting distance is set to 200 [mm]. In this case, the waiting distance will almost be 3390 clocks, which is obtained by following expressions.

$$200/0.059 = 3389.8$$

The reader CPU 501 waits for lapse of 3390 clocks, during which clocks, the reader CPU 501 waits for a state change of the detection result of the sheet end sensor 11, from "sheet absence" state to "sheet presence" state.

The reader CPU 501 determines whether the sheet end sensor 11 detected sheet presence (S813) or not. For example, in a case where the sheet is not fed to the conveyance roller 3, or in a case where the sheet front end is caught by the conveyance path P, the detection result of the sheet end sensor 11 is kept "sheet absence" state. In a case where the detection result of the sheet end sensor 11 is "sheet absence" (S813: No), and the waiting time set in the processing of Step S812 is elapsed (S814: Yes), the reader CPU 501 determines that delay jam occurred (S815). Then, the reader CPU 501 stops rotating the ADF motor 250, regardless of whether other sheet exists on the conveyance path P or not (S816). The reader CPU 501 notifies the controller CPU 551 of occurrence of delay jam (S817).

Note that, in response to the notification of occurrence of delay jam, the controller CPU 551 displays a similar screen shown in FIG. 8 on the operation unit 554 as a message to the user. The screen shown in FIG. 8 is a screen for informing the user that there was a failure in sheet reading. Also, it is a screen for informing the user some matter relating to jam releasing processing including how to remove sheets left on the conveyance path P. It is highly possible that, when delay jam occurred, the sheet is crumpled because the sheet was caught in the conveyance path. The screen as shown in FIG. 8 presents contents instructing to smooth the removed sheet, return the sheet to the document bundle S again which is left on the document tray 30, and restart reading.

If the detection result from the sheet end sensor 11 is "sheet presence" (S813: Yes), the reader CPU 501 determines whether the preceding sheet is in the middle of being read or not (S818). If it is determined that the preceding sheet is in the middle of being read (S818: Yes), the reader CPU 501 waits until the sheet reading is completed (S819). Here, the sheet whose front end is detected in the Step S813 corresponds to a sheet shown by the chain line in FIG. 5. Then, the preceding sheet in the Step S818 corresponds to the sheet shown by the dotted line in FIG. 5. When the reading of the preceding sheet is completed (S819: Yes), the reader CPU 501 notifies the controller CPU 551 of the completion of the reading of the preceding sheet (S820).

In response to the notification notifying the completion of reading, the controller CPU 551 starts to prepare reading of the following sheet. It means that, when the following sheet is normally conveyed and the notification notifying the completion of the reading of the preceding sheet is received, the controller CPU 551 starts to prepare reading of the following sheet, including obtaining memory for image processing, setting device for image processing and the like. Then, at a timing at which reading of the following sheet is prepared, the controller CPU 551 notifies the reader CPU 501 of reading permission. The reader CPU 501 waits for reading permission notification from the controller CPU 551 (S821).

If the reading permission is not notified (S821: No), the reader CPU 501 determines whether the front end of the following sheet reached a temporarily stop position (arrow P2 in FIG. 5) (S822) or not. If it is determined that the front end of the following sheet reached the temporarily stop position (arrow P2 in FIG. 5) (S822: Yes), the reader CPU 501 stops rotating the ADF motor and stops conveying the sheet (S823). The reading of the preceding sheet is completed in the state of Step S823 so that the rotation of ADF motor can be stopped.

Note that the fact of whether the front end of the following sheet reached the temporarily stop position or not can be determined by counting the driving clock number of the ADF motor after the detection of the front end of the sheet in Step S813. Following sheet is also already held by the conveyance roller 3, which has stronger conveyance force than that of the separation roller 2. Thus, the moving distance per one pulse of the driving clock of the ADF motor is based on the sheet moving distance by the conveyance roller, not the sheet moving distance by the separation roller 2 (0.059 [mm]). In the present embodiment, the sheet moving distance by the conveyance roller 3 per one clock in the driving clock of the ADF motor 250 is deemed 0.085 [mm].

The reader CPU 501 waits for reading permission notice from the controller CPU 551 (S824). When receiving the reading permission notice (S824: Yes), the reader CPU 501 starts to rotate the ADF motor (S825).

If the reader CPU 501 received the reading permission in the Step S821 (S821: Yes), and if the reader CPU 501 started to rotate the ADF motor 250 in the Step S825, the reader CPU 501 determines whether or not the front end of the following sheet reached the reading position R (arrow P5 in FIG. 5) (S826). If it is determined that the front end of the following sheet reached the reading position R (S826: Yes), the reader CPU 501 starts reading of the following sheet (S827).

The reader CPU 501 sets waiting time (waiting distance), which is a time to wait for a start of detecting the rear end of the sheet by the sheet end sensor 11 (FIG. 7: S828). The waiting time is set to avoid any possibility that the sheet end sensor 11 erroneously detects "sheet absence" regardless of "sheet presence" due to a mechanical vibration of the sensor after detection of "sheet presence" by the sheet end sensor 11 in the processing of Step S813. It means that a waiting time corresponding to a distance of a fixed length from the front end of the sheet is also set. The reader CPU 501 ignores the detection result of the sheet end sensor 11 for a period during the set waiting time elapses.

After the lapse of the set waiting time (S829: Yes), the reader CPU 501 starts to detect the presence/absence of the sheet based on the detection result of the sheet end sensor 11. Also, the reader CPU 501 sets time to continue the detection (waiting distance) (S830). The reader CPU 501 determines whether the sheet end sensor 11 detected "sheet absence" or not. For example, if the front end of the sheet is caught by the jump stand on the reference white board 219, the detection result of the sheet end sensor 11 may be kept in "sheet presence" state. If the detection result of the sheet end sensor 11 is "sheet presence" (S831: No) and the waiting time set in the processing of Step S830 elapsed (S832: Yes), the reader CPU 501 determines that stay jam occurred (S833). Then, regardless of whether other sheet exists on the conveyance path P or not at this time, the reader CPU 501 stops rotating the ADF motor 250 (S834). The reader CPU 501 notifies the controller CPU 551 of occurrence of stay jam (S835).

In response to the notification of occurrence of stay jam, the controller CPU 551 displays a similar screen shown in FIG. 8 on the operation unit 554. Similar to the case as described where delay jam occurred, it is a screen for presenting the user that there was a failure in sheet reading. Also, it is a screen for presenting the user some information relating to jam releasing processing including how to remove sheets left on the conveyance path P.

If the detection result of the sheet end sensor 11 is "sheet absence" (S831: Yes), the reader CPU 501 sets distance from the detecting position of the sheet end sensor 11 to the reading position R as reading completion distance (S836). Note that, in the present embodiment, the sheet moving distance by the conveyance roller 3 per one clock in the driving clock of the ADF motor 250 is almost the same as that by the delivery roller 5.

Further, based on the detection result of the document presence/absence sensor 12, the reader CPU 501 determines whether or not there is any sheet left on the document tray 30 (S837). If it is determined that no sheet is left on the document tray 30 (S837: Yes), in response to the completion of reading the document bundle S (S838: Yes), the reader CPU 501 notifies the controller CPU 551 of the completion of document reading (S839). Then, the reader CPU 501 sets a distance as a delivery completion distance. This is a distance including a margin to avoid the rear end of the final sheet, having separated from the nip part of the delivery roller 5, being caught in the delivery roller 5 (S840).

After rotating the delivery roller 5 by the delivery completion distance (S841: Yes), the reader CPU 501 stops rotating the ADF motor 250 (S842). A series of reading operation to the document bundle S is completed in this way.

<Early Jam Detection Processing>

Description will be given in detail using FIGS. 6, 7, and 9 with regard to detection processing of early jam.

If it is determined that there was a sheet left on the document tray 30 in the Step S837 (S837: No), the feeding of the following sheet has already been started by the separation roller 2. In this case, the reader CPU 501 sets again the waiting time (waiting distance), which is a time to wait for a start of detecting the front end of the sheet by the sheet end sensor 11 in the processing of Step S802. Note that in the processing of Step S802 to the second and the subsequent sheets of the sheet bundle S, a value (second count value) in which the distance from the arrow P2 to the arrow P5 shown in FIG. 5 is converted into the sheet moving distance (0.059 [mm]) by the separation roller 2 is set. This allows determining whether the distance between the sheets which is at least required between the preceding sheet and the following sheet can be established or not. Description will be given with regard to this point using FIG. 9.

FIG. 9 is a diagram for determining whether the distance between the sheets is broad or narrow based on the detection result from sheet end sensor 11. Note that the presence/absence of occurrence of early jam can be determined based on the result of the determination, i.e., the distance is broad or narrow. Note that, in FIG. 9, the sheet which is precedingly fed/conveyed is shown by a dotted line, and the sheet which is followingly fed/conveyed is shown by chain line. The arrows P1, P2, and P5 in FIG. 9 respectively correspond to the arrows P1, P2, and P5 shown in FIG. 5.

Figure 9A:
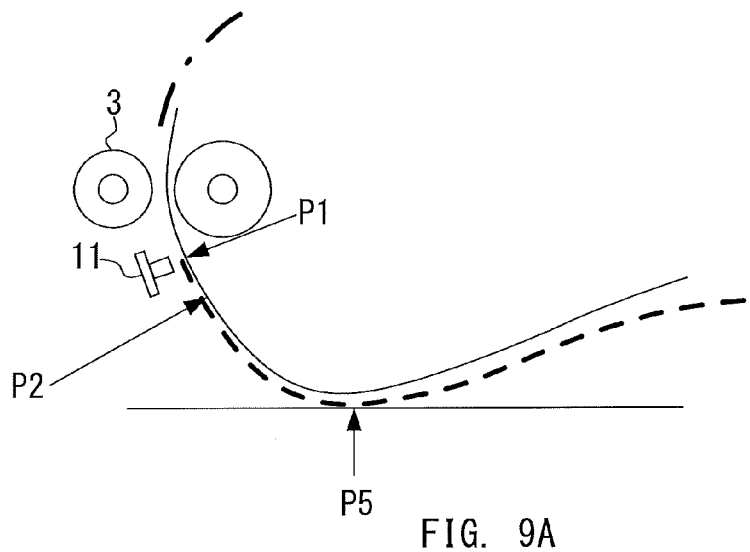
FIGS. 9A, 9B and 9C are diagrams for determining the distance between the sheets to be broad or narrow, based on the detection result of sheet end sensor.
Figure 9B:
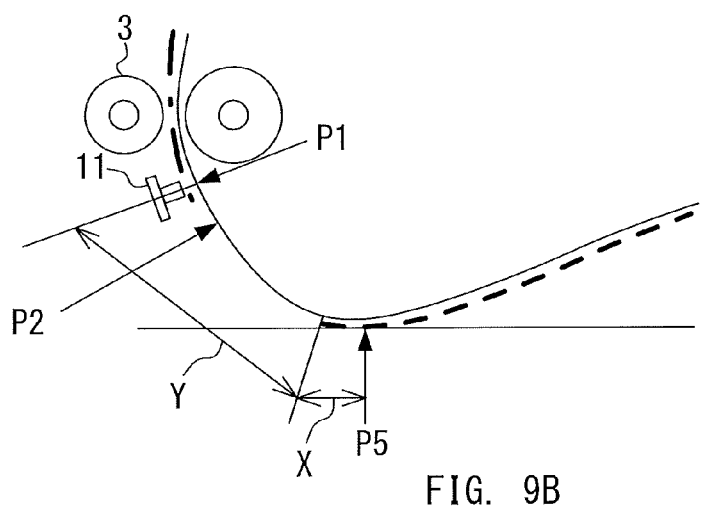

FIG. 9A shows a state in which the rear end of the preceding sheet is detected by the sheet end sensor 11. Also, the following sheet is being fed only by the separation roller 2. FIG. 9B shows a state in which the sheet is further conveyed from the state shown in FIG. 9A. In FIG. 9B, the rear end of the preceding sheet is further moved to the arrow P5. Further, as shown in FIG. 9B, the distance from the rear end of the preceding sheet to the arrow P5 is defined as distance X. Also, the distance from the arrow P1 to the rear end of the preceding sheet is defined as distance Y.

In this case, in a state shown in FIG. 9B, the rear end of the preceding sheet is positioned upstream side by the distance X from the position shown by the arrow P5. In such a state, in a case where the front end of the following sheet passed through the detecting position of the sheet end sensor 11 (arrow P1), the image reading apparatus 400 determines that early jam occurred.

Note that, description is given in FIG. 9B in a case where the front end of the following sheet is positioned between the arrows P1 and P2. Not limited to this, even in a case where the front end of the following sheet is positioned between the arrows P2 and P5, it is determined that early jam occurred. Also, the following sheet is already nipped by the conveyance roller 3, so that it is conveyed at the same speed as that of the preceding sheet. Therefore, the distance between the preceding sheet and the following sheet is established.

Figure 9C:
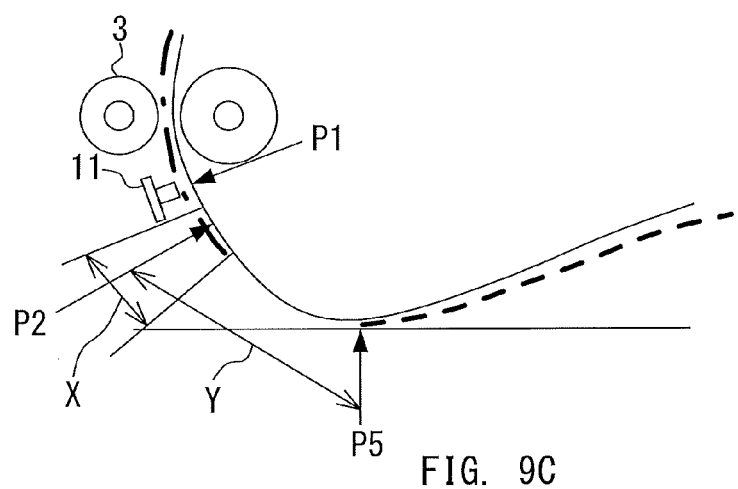

FIG. 9C shows a state in which the front end of the following sheet is further moved by the distance X from the state shown in FIG. 9B. Note that the rear end of the preceding sheet reached the reading position R (arrow P5 in FIG. 9C), at which timing, the image reading apparatus 400 completes reading of the preceding sheet. On the other hand, the following sheet cannot avoid passing through the position of the arrow P2 when it moves by the distance X from the state shown in FIG. 9B.

Here, in a case where the distance between the preceding sheet and the following sheet is sufficiently established, the detection result of the sheet end sensor 11 turns "sheet absence" in the state shown in FIG. 9B. Further, in the state shown in FIG. 9C, the front end of the following sheet is positioned in front of the position of the arrow P2. That is, the front end of the following sheet is positioned upstream side of the position of the arrow P2. This allows the image reading apparatus 400 to temporarily stop the sheet conveyance. As mentioned, the image reading apparatus 400 can determine the presence/absence of occurrence of early jam based on the detection result of the sheet end sensor in the state shown in FIG. 9B. Note that it is immediately after the detection of the rear end of the preceding sheet in the Step S803 that the waiting time is set in the Step S802, which is the step to the second and the following sheets of the document bundle S. Therefore, by setting time which corresponds to the distance between the arrows P2 and P5 shown in FIG. 5 in the Step S802, it can be determined whether the distance between the rear end of the preceding sheet and the front end of the following sheet is greater than the distance between the arrows P2 and P5 or not.

Back to the description of FIG. 6, in a case where the distance between the preceding sheet and the following sheet cannot sufficiently be established, the detection result of the sheet end sensor 11 turns "sheet presence" in the processing of Step S804 (S804: Yes). In this case, the reader CPU 501 determines that early jam occurred (S805). Description will be given using FIGS. 6, 10 and 11 with regard to processing performed after a case where the occurrence of early jam is determined by the reader CPU 501.

Figure 10:
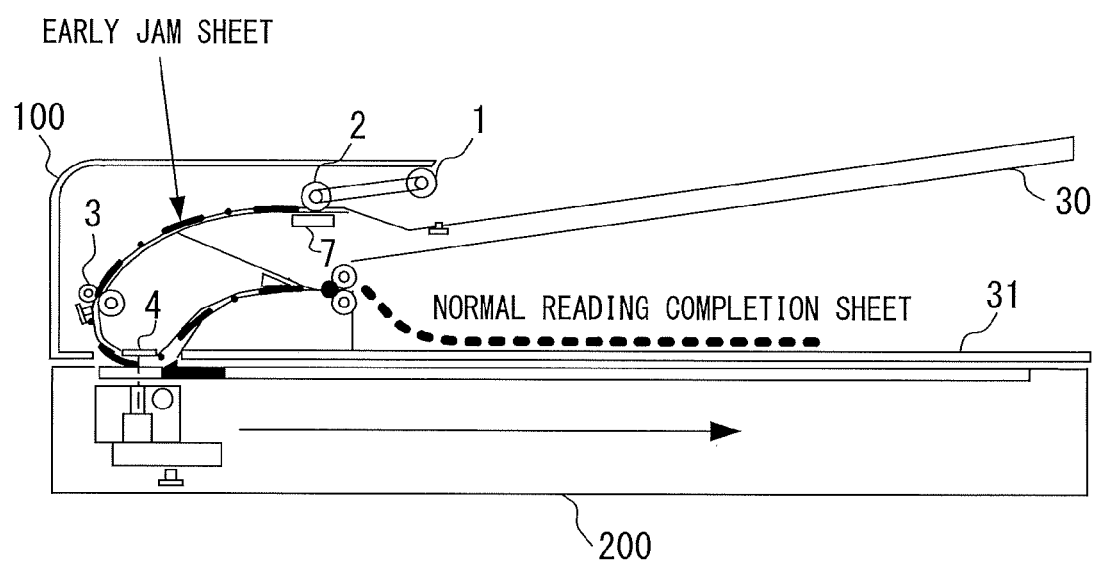
FIG. 10 is a diagram explaining the positional relation between the preceding sheet and following sheet when early jam occurs.
Figure 11:
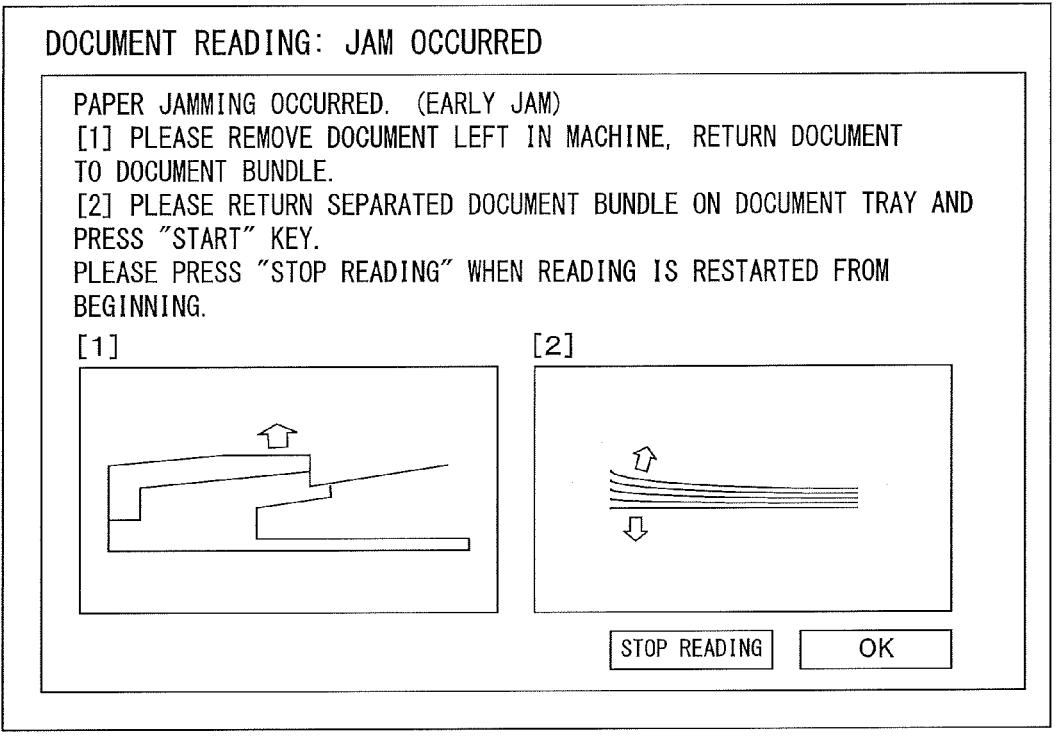
FIG. 11 is a diagram illustrating an example of a UI screen displayed on a display screen of operation unit when early jam occurs.

FIG. 10 is a diagram explaining the positional relation between the preceding sheet and the following sheet when early jam occurs. FIG. 11 is a diagram illustrating an example of a UI screen displayed on an operation unit 554 when early jam occurs. Note that processing of Steps S806 to S811, enclosed by a square frame, corresponds to processing after early jam occurred.

At a time when processing of Step S805 is performed, as shown in FIG. 9B, the preceding sheet is still in the middle of being read whereas the following sheet is being conveyed on the conveyance path P. The following sheet can be conveyed because it is not caught in the conveyance path. When delay jam or stay jam occurs, it is not possible to convey the sheet. When early jam occurs, the reader CPU 501 does not stop rotating the ADF motor 250 immediately but it keeps to rotate the ADF motor 250 until reading of the preceding sheet is completed (S806).

In response to the completion of the reading of the preceding sheet (S806: Yes), the reader CPU 501 notifies the controller CPU 551 of the completion of image reading (S807). The reader CPU 501 sets the distance, which is a distance required for the rear end of the preceding sheet to separate from the nip part of the delivery roller after the completion of image reading (delivery completion distance)(S808). If it is determined that the rotation amount of the delivery roller 5 reached the delivery completion distance (S809: Yes), the reader CPU 501 stops rotating the ADF motor 250 (S810). Then, the CPU 501 for reading notifies the controller CPU 551 of occurrence of early jam (S811).

If it is determined that early jam occurred, unlike the case where the delay jam or stay jam occurred, the reader CPU 501 does not immediately stop rotating the ADF motor 250 but keeps rotating the ADF motor 250 until the preceding sheet is delivered. Controlling in this way, as shown in FIG. 10, the reader CPU 501 can normally complete the reading of the preceding sheet and deliver the preceding sheet to the delivery tray 31. On the other hand, the following sheet will be left on the conveyance path P. That is, the following sheet will exist inside the ADF 100. This allows the user to easily sort the sheet which was normally read (preceding sheet) and which was not normally read (following sheet).

Note that, in response to receiving the notification notifying the occurrence of early jam, the controller CPU 551 displays a similar screen shown in FIG. 11 on the operation unit 554. The screen shown in FIG. 11 is a screen for presenting the user that there was a failure in sheet reading. Also, it is a screen for presenting the user some information relating to jam releasing processing including how to remove sheets left on the conveyance path P. Also, the screen shown in FIG. 11 presents that the sheet delivered to the delivery tray is the sheet which was normally read.

The screen shown in FIG. 11 presents contents instructing to sufficiently separate the document bundle S left on the document tray 30 before resuming the reading operation. The user is recommended to separate the sheet to separate the tight contact sheets of the document bundle. Then, the user is instructed to start the process of the image reading apparatus 400 for reading the document bundle S left on the document tray as the sheets following the sheets already delivered to the delivery tray 31. Note that the sheet on the conveyance path is not caught in the conveyance path P. Therefore, instruction to smooth the sheet is not presented on the screen shown in FIG. 11.

As mentioned, the image reading apparatus 400 of the present embodiment comprises the driving mechanism made up of a single ADF motor 250. Further, the image reading apparatus 400 is controlled so as not to immediately stop sheet conveyance even in a case where the distance between the sheets being conveyed is narrow. In particular, in the image reading apparatus 400 of the present embodiment, it is controlled such that the first sheet of the preceding sheet is read to the end and is normally delivered and the second sheet of the following sheet is not delivered but to remain on the conveyance path. This allows the user to easily sort the sheet which has already read and the sheet which is yet to be read when early jam occurs even the sheet is fed by the driving mechanism made up of a single ADF motor 250. Due to this, for example, user's work load of resuming reading can be reduced. Note that the message to the user relating to the jam releasing processing can make the controller CPU work as communication means. In addition, the message can make, for example, the reader CPU 501 of the image reading apparatus 400 works as communication means. In this case, similar screen shown in FIG. 8, is displayed on the display unit (not shown), the display unit included in the image reading apparatus 400.

Second Embodiment

Description is given in the first embodiment in a case where rotation of the ADF motor 250 is controlled to stop at a timing at which the rear end of the preceding sheet separates from the nip part of the delivery roller 5 when early jam occurs. In the present embodiment, description is given with regard to an image reading apparatus which controls to stop rotation of the ADF motor 250 at a timing at which the front end of the following sheet passes through the nip part of the delivery roller 5. The basic processing of the image reading apparatus of the present embodiment is the same as that of the image reading apparatus described in the first embodiment. The difference is that the longer distance is set for the ADF motor 250 to stop its rotation when an occurrence of early jam is determined. Further, the same reference symbols are used in the functional configurations which are the same as that already described and the description thereof is omitted.

In the processing of Step S808 shown in FIG. 6, the reader CPU 501 sets the distance, which is a distance for the rear end of the preceding sheet to separate from the nip part of the delivery roller 5. In the present embodiment, the distance 20 [mm] is added to the distance set in the processing of Step S808. The added distance is set as one of the examples of the distance required for the front end of the following sheet to be separated from the nip part of the delivery roller 5 and required for the user to pick up the front end with his finger to pull out the following sheet. Setting the distance in this way, the rotation of the ADF motor 250 is controlled to stop when the front end of the following sheet is protruded to the delivery tray 31 side. This allows the user to easily identify the sheet to be removed.

Figure 12:
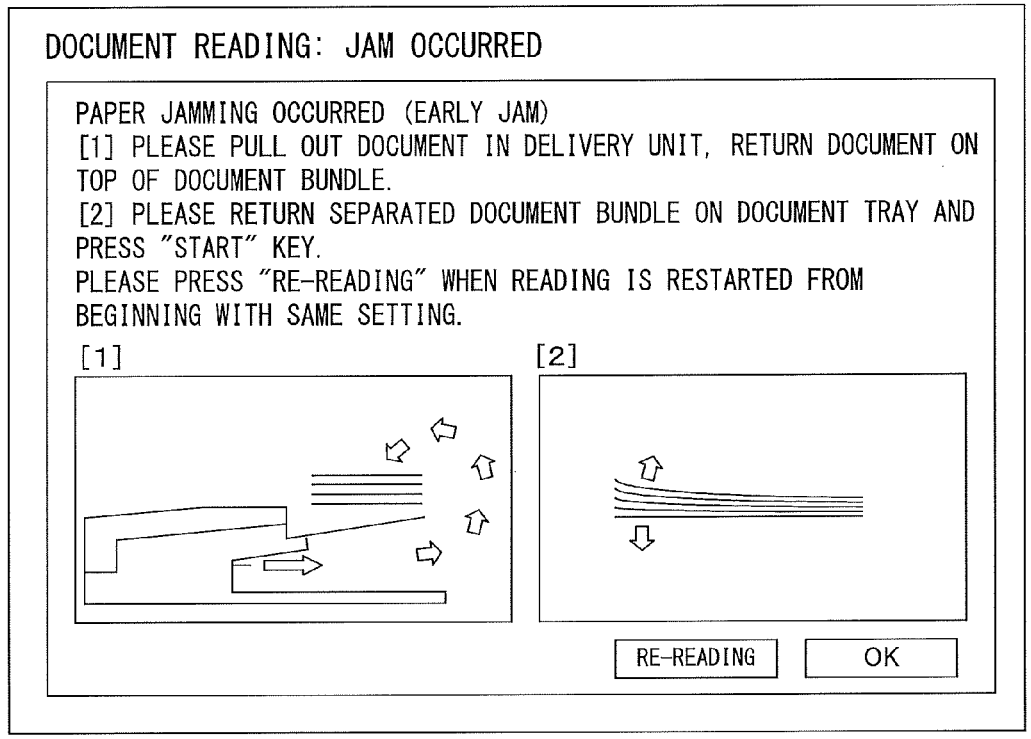
FIG. 12 is a diagram illustrating an example of a UI screen displayed on a display screen of operation unit when early jam occurs in the image reading apparatus according to a second embodiment.

FIG. 12 is a diagram illustrating an example of a UI screen displayed on a display screen of the operation unit 554 when jam occurs. The screen as shown in FIG. 12 is a screen for presenting the user that there was a failure in sheet reading. Also, it is a screen for presenting the user some information relating to jam releasing processing including how to remove sheets left on the conveyance path P. The screen as shown in FIG. 12 presents contents instructing to the user to pick up the front end of the sheet left in the conveyance path P (following sheet) and pull out the sheet.

Also, in some cases, the user may determine that overlap feeding is easily caused to the document bundle S due to occurrence of early jam. For such cases, the image reading apparatus may be configured to allow restart of reading the document bundle S, including the sheet already read, from beginning. In this case, like a "re-reading" button shown in FIG. 12, the UI screen may display a button to which a function of re-reading the document bundle from the beginning is assigned.

As mentioned, in the image reading apparatus of the present embodiment, sheet conveyance is stopped with a part of early jam sheet (following sheet: second sheet) exposed outside the apparatus. This allows the user to easily remove the early jam sheet. Further, easy removal of the early jam sheet allows the user to easily sort the sheet which has already been read and the sheet which is yet to be read when early jam occurs. Also, the time required to restart reading operation can be reduced.

The present invention has been described in detail by way of the above-mentioned embodiments, but the scope of the present invention is not limited to those embodiments.

While the present invention has been described with reference to exemplary embodiments and it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-036335, filed Feb. 27, 2014, and which is hereby incorporated by reference herein in its entirety.

What is claimed is:

1. A sheet reading apparatus, comprising:
    a feed unit configured to feed the sheet from a document tray to a conveyance path one by one;
    a conveyance unit configured to convey the sheet to a reading position along the conveyance path;
    a delivery unit configured to convey a sheet having passed through the reading position to an output tray;
    a motor for driving the conveyance unit and the delivery unit;
    a detection unit configured to detect a sheet being conveyed along the conveyance path;
    a reading unit configured to read the sheet being conveyed by the conveyance unit at the reading position; and
    a control unit configured to control the motor based on a detection result of the detection unit,
    wherein the control unit is further configured to stop the motor, not waiting for the delivery of the sheet to the output tray, in a case where a rear end of the sheet being conveyed is not detected within a predetermined time after a timing at which a front end of the sheet being conveyed is detected, and
    wherein the control unit is further configured to set a time for driving the motor, and based on the set time, to control stopping the motor such that, in a case where a distance between a preceding sheet which is being conveyed by the delivery unit and a following sheet which is being conveyed by the conveyance unit is shorter than a predetermined distance, the preceding sheet is delivered to the output tray and the following sheet remains on the conveyance path.

2. The sheet reading apparatus according to claim 1, wherein the detection unit is positioned on a downstream portion of the conveyance path in the conveyance path.

3. The sheet reading apparatus according to claim 1, further comprising:
    a memory for storing image data which is output from the reading unit; and
    a processor for controlling writing of the image data;
    wherein the control unit is further configured to:
        notify the processor of completion of reading in response to a detection of the rear end of the sheet being conveyed;
        stop the motor after a rear end of the preceding sheet passes through the reading position in a case where a distance between a preceding sheet which is being conveyed by the delivery unit and a following sheet which is being conveyed by the conveyance unit is longer than the predetermined distance; and
        in response to receiving reading permission from the processor, start to rotate the motor to convey the following sheet to the reading position.

4. The sheet reading apparatus according to claim 1,
    wherein the control unit is further configured to determine whether a space between the preceding sheet and the following sheet on the conveyance path is shorter than the predetermined distance or not; and
    wherein the conveyance unit is further configured to stop conveyance of the sheet in a state where the preceding sheet is delivered to the output tray and the following sheet exists on the conveyance path, in a case where it is determined that, by the control unit, that the space between the preceding sheet and the following sheet on the conveyance path is shorter than the predetermined distance.

5. The sheet reading apparatus according to claim 1,
    wherein the predetermined distance is shorter than a distance from a detecting position of the detection unit to a reading position of the reading unit on the conveyance path.

6. The sheet reading apparatus according to claim 1,
    wherein the predetermined distance is a total distance of a first distance, a second distance, and a third distance, the first distance is a distance required to reduce sheet conveyance speed which is conveyed in a predetermined reading speed to stop the sheet conveyance thereafter, the second distance is a distance required to accelerate a reading speed to a predetermined reading speed from the state where the sheet conveyance is stopped, and the third distance is a distance required for stabilization of sheet conveyance state after the speed is accelerated to the reading speed.

7. The sheet reading apparatus according to claim 4,
    wherein the control unit is further configured to determine that an early jam occurred in a case where the space between the preceding sheet and the following sheet on the conveyance path is shorter than the predetermined distance.

8. The sheet reading apparatus according to claim 4,
    wherein the conveyance unit is further configured to stop conveying the sheet with a part of the following sheet exposed outside the apparatus in a case where it is determined, by the control unit, that the space between the preceding sheet and the following sheet is shorter than the predetermined distance.

9. The sheet reading apparatus according to claim 4, further comprising:
    a notifying unit configured to communicate a message to a user, wherein the notifying unit is further configured to notify the user to return the following sheet which exists on the conveyance path on the document tray again in a case where it is determined, by the control unit, that the space between the preceding sheet and the following sheet is shorter than the predetermined distance.

10. The sheet reading apparatus according to claim 1,
    wherein the control unit is configured not to control the motor based on the detection result of the detection unit for a predetermined period after the rear end of the preceding sheet is detected by the detection unit.

11. The sheet reading apparatus according to claim 1,
    wherein the control unit is further configured to:
        count driving clock of the motor,
        stop the motor in a case where a rear end of the sheet being conveyed is not detected before the counted value reaches a first count value which corresponds to the predetermined time, the counted value counted after a timing at which the front end of the sheet being conveyed is detected, and stop the motor such that, in a case where the front end of the following sheet is detected before the counted value reaches a second count value, the preceding sheet is delivered to the output tray and the following sheet remains on the conveyance path, the counted value counted after a timing at which the rear end of the preceding sheet is detected.

12. The sheet reading apparatus according to claim 11, wherein the control unit is further configured to determine whether the space between the preceding sheet and the following sheet is shorter than the predetermined distance in response to the driving clock number counted, by the detection unit, after the detection of the rear end of the sheet and before the detection of the front end of the following sheet.

13. The sheet reading apparatus according to claim 11, wherein the predetermined distance is a distance which is shorter than a distance on the conveyance path from a detecting position of the detection unit to a reading position of the reading unit.

14. The sheet reading apparatus according to claim 11, wherein the predetermined distance is a total distance of a first distance, a second distance, and a third distance, the first distance is a distance required to reduce speed of sheet conveyed in a predetermined reading speed to stop the sheet conveyance thereafter, the second distance is a distance required to accelerate a reading speed to a predetermined reading speed from the state where the sheet conveyance is stopped, and the third distance is a distance required for stabilization of sheet conveyance state after the speed is accelerated to the reading speed.

15. The sheet reading apparatus according to claim 12, wherein the control unit is further configured to determine that a jam has occurred in a case where the space between the preceding sheet and the following sheet on the conveyance path is shorter than the predetermined distance.

16. The sheet reading apparatus according to claim 12, wherein the conveyance unit is further configured to stop conveying the sheet with a part of the following sheet exposed outside the apparatus in a case where it is determined, by the control unit, that the space between the preceding sheet and the following sheet is shorter than the predetermined distance.

17. The sheet reading apparatus according to claim 12, further comprising:

a notifying unit configured to communicate a message to a user, wherein the notifying unit is further configured to notify the user to return the following sheet existing on the conveyance path to the document tray again in a case where it is determined, by the control unit, that the space between the preceding sheet and the following sheet is shorter than the predetermined distance.

18. The sheet reading apparatus according to claim 11, wherein the control unit is further configured not to control the motor based on the detection result of the detection unit for a predetermined period after the rear end of the preceding sheet is detected by the detection unit.

* * * * *